United States Patent [19]

Schenk

[11] 4,308,646
[45] Jan. 5, 1982

[54] FRONT INSERT RECEPTACLE

[75] Inventor: Peter Schenk, West Islip, N.Y.

[73] Assignee: Dzus Fastener Co., Inc., West Islip, N.Y.

[21] Appl. No.: 35,395

[22] Filed: May 2, 1979

[51] Int. Cl.³ .............................................. A44B 17/00
[52] U.S. Cl. .................................................. 24/221 R
[58] Field of Search ........... 24/73 RM, 221 R, 221 A, 24/221 K, 221 L, 221 RC; 85/5 P; 248/27.1, 544

[56] References Cited

U.S. PATENT DOCUMENTS

| | | | |
|---|---|---|---|
| 2,442,064 | 5/1948 | Veit | 24/221 A |
| 2,542,968 | 2/1951 | Zahodiakin | 24/221 R |
| 2,599,207 | 6/1952 | Spahr et al. | 24/221 K |
| 2,610,379 | 9/1952 | Bugg | 24/221 A |
| 3,504,875 | 4/1970 | Johnson et al. | 24/221 K X |
| 3,874,041 | 4/1975 | Smith | 24/221 R |
| 3,975,804 | 8/1976 | Schenk | 24/221 A |
| 4,128,923 | 12/1978 | Bisbing | 24/221 R |

FOREIGN PATENT DOCUMENTS

| | | | |
|---|---|---|---|
| 1295280 | 5/1969 | Fed. Rep. of Germany | 85/5 P |
| 629216 | 9/1949 | United Kingdom | 85/5 P |

Primary Examiner—Thomas J. Holko
Attorney, Agent, or Firm—Kane, Dalsimer, Kane, Sullivan and Kurucz

[57] ABSTRACT

A front insert receptacle for fastening two members together. The receptacle includes a housing formed with a base and a pair of opposing spaced legs adapted to receive a stud therebetween. A stop surface is on the housing to engage with the upper surface of one member when the receptacle is partially extended through an opening therein. A rotational stop is on the housing to prevent rotation of the housing with respect to the one member when extended therein. A cam surface is located on the housing in the form of an inwardly extending tang on at least one of the legs. A shiftable cam follower in the form of a disc is in the housing initially positioned so that each tang initially engages with the portion of the cam member when the housing is inserted in the opening in the one member. A biasing spring in the housing engages with the cam member and initially biases the cam member against the tangs. When the disc shaped cam member is rotated with respect to the tangs, the portions in engagement with the tangs will disengage therewith whereupon the spring will direct the disengaged portions of the cam follower into engagement with the undersurface of the member in which the receptacle is positioned to lock the receptacle in position on the one member. Stud locking surfaces are located on the housing so that when a stud is engaged with the other member to be fastened and passed into the housing it will lock with the receptacle and hold the two members together.

8 Claims, 5 Drawing Figures

FRONT INSERT RECEPTACLE

BACKGROUND OF THE INVENTION

Various types of front insert receptacles have been developed in recent years for reasons such as avoiding the problems resulting from difficulty of access to the rear side of a panel or similar structures when mounting the receptacle. Several successful examples are depicted in the applicant's prior U.S. Pat. No. 3,975,804, the contents of which are incorporated herein by reference. In general, the front insert receptacle designs shown in that patent deal with various types of tubular housings with keyways and wound springs for facilitating mounting of the various forms. All of the structures show a portion of the housing which is shiftable between an operative and an inoperative position so that when the receptacle is positioned in an opening in a member, activation of the locking means from the entrance side will cause shifting of portions of the housing and locking of the receptacle in position. Other portions of the various receptacle designs contain engagement structure for coupling with a stud interengaged with a second member so that the two members can be fastened together by the stud and receptacle.

An example of a snap-in type of front insert receptacle is shown in U.S. Pat. No. 4,128,923. Once again, the principal is to provide a means for mounting the receptacle from the front side of a panel like surface without requiring access to the rear of the panel.

The type of structures in the above discussed patents and contemplated by the improved structure of the present invention are prevalent in wall mountings and in panel to panel engagements such as used in cabinets and the like.

Naturally, in fasteners of this type, cost is quite important and minimizing the cost of materials, the number of components and assembly time is desirable.

SUMMARY OF THE INVENTION

With the above background in mind, it is among the primary objectives of the present invention to provide a front insert receptacle of the type described above which is adapted to be mounted in a surface member such as a panel by insertion into an opening from one side thereof and locked in position by appropriate manipulation from the same exposed side of the member or panel.

A minimum number of parts of inexpensive construction are provided leading to an overall low cost product. The receptacle is designed to be quickly and efficiently inserted which further enhances the minimum cost feature of the receptacle particularly when the receptacle is mass produced and used in large numbers in single and multiple installations.

It is an objective to provide a receptacle which is designed for use with a stud of the type employing a spiral clam slot designed for quarter turn action in locking and unlocking the stud with respect to the receptacle. This type of arrangement is commonly used, for example, in fastening panel to panel arrangements or mounting a member on a wall surface where access to the rear side of the receiving surface is difficult or impossible. It is an objective to provide an entire assembly operation for the receptacle which includes insertion and mounting of the receptacle in position from the exposed side of the receiving panel or wall surface and the ultimate fastening and unfastening of the stud with respect to the receptacle from the same exposed side of the panel on which the receptacle is mounted.

It is an objective to provide a receptacle with a minimum number of component parts and utilized in a manner which permits it to be easily inserted from the front of the receiving member and quickly and easily locked in position from the same side of the panel in which it is inserted with appropriate receiving surfaces exposed for coupling with a stud to form a fastener assembly.

In summary, a front insert receptacle for fastening two members together is provided. It includes a housing formed with a base and at least a pair of opposing spaced legs adapted to receive a stud therebetween. A stop surface is on the housing to engage with the upper surface of one member when the receptacle is partially extended through an opening therein. Rotational stop means is on the housing to prevent rotation of the housing with respect to the one member when extended therein. A cam surface is on the housing and a shiftable cam follower is also on the housing initially positioned so that the cam surface retains the cam follower when the housing is inserted in the opening in the one member. Biasing means is on the housing in engagement with the cam follower and initially biasing the cam follower against the cam surface and is responsive to shifting of the cam follower with respect to the cam surface to a position out of engagement therewith whereupon the biasing means will direct at least a portion of the cam follower into engagement with the undersurface of the one member to retain the receptacle in position on the one member. Finally, stud locking means is on the housing and is adapted to engage with a stud after the housing has been mounted on the one member and the stud has been mounted on the other member and inserted into the housing. Relative rotation of the stud with respect to the housing in one direction will activate the stud locking means and relative rotation of the stud with respect to the housing in a second direction will deactivate the stud locking means and permit the stud to be removed from the housing and the two members to be separated.

With the above objectives among others in mind, reference is made to the attached drawings.

DETAILED DESCRIPTION

Figure 1:
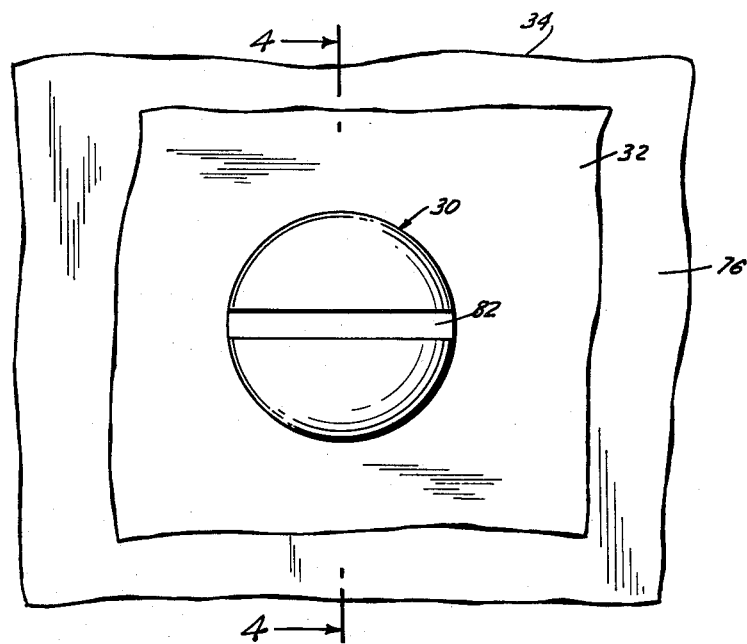
FIG. 1 is a top plan view of a fastener assembly including the receptacle of the invention shown fastening fragmentary portions of two members together.

Receptacle 20 as depicted in FIGS. 1—5 of the drawings is designed so that it can be manufactured of a conventional inexpensive metal or plastic material. Receptacle 20 is designed for use, for example, in panel to panel arrangements or mounting of fixtures of other structures to a wall surface with a receiving panel or surface of the type where access to the rear side thereof is difficult or impossible. The receptacle is mounted from the exposed front surface of the receiving panel.

In the depicted form receptacle 20 includes a U-shaped housing 22, a base plate 24, a helical compression spring 26, and a cam follower disc or plate 28. The receptacle 20 is designed for coupling and uncoupling with a stud 30 to form a fastener assembly.

Figure 2:
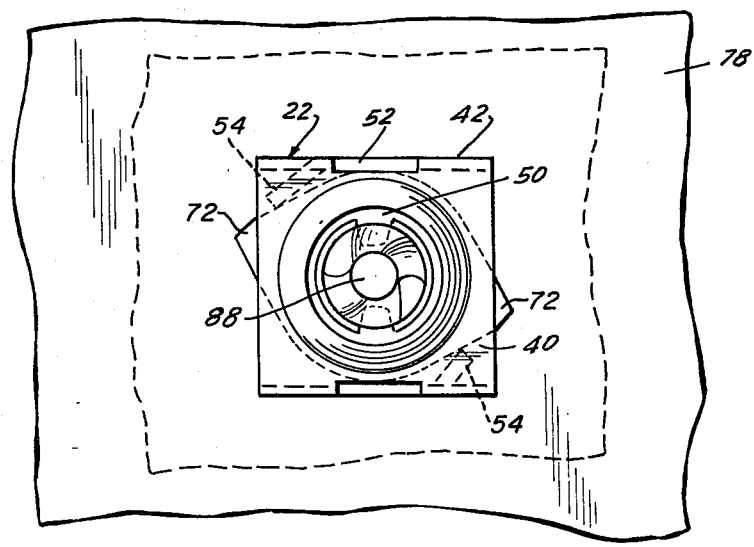
FIG. 2 is a bottom plan view thereof.
Figure 4:
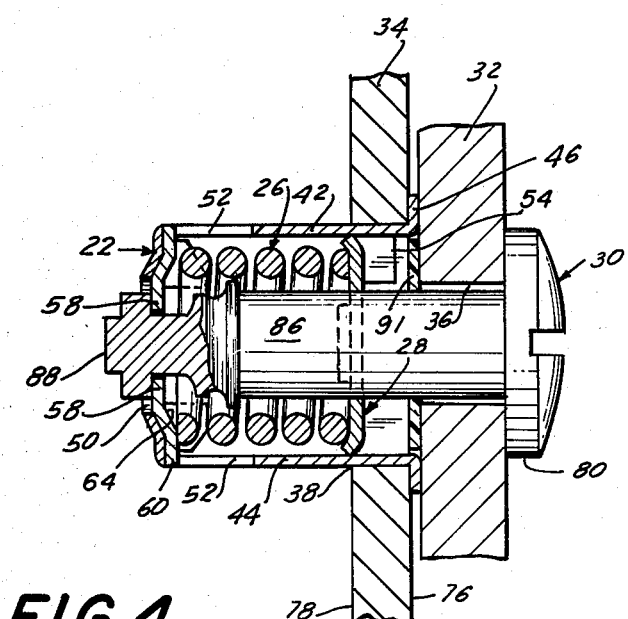
FIG. 4 is a sectional view thereof taken along the plane of line 4—4 of FIG. 1 and showing the stud and receptacle in coupled condition prior to rotation of the stud to fasten the stud and receptacle together.
Figure 5:
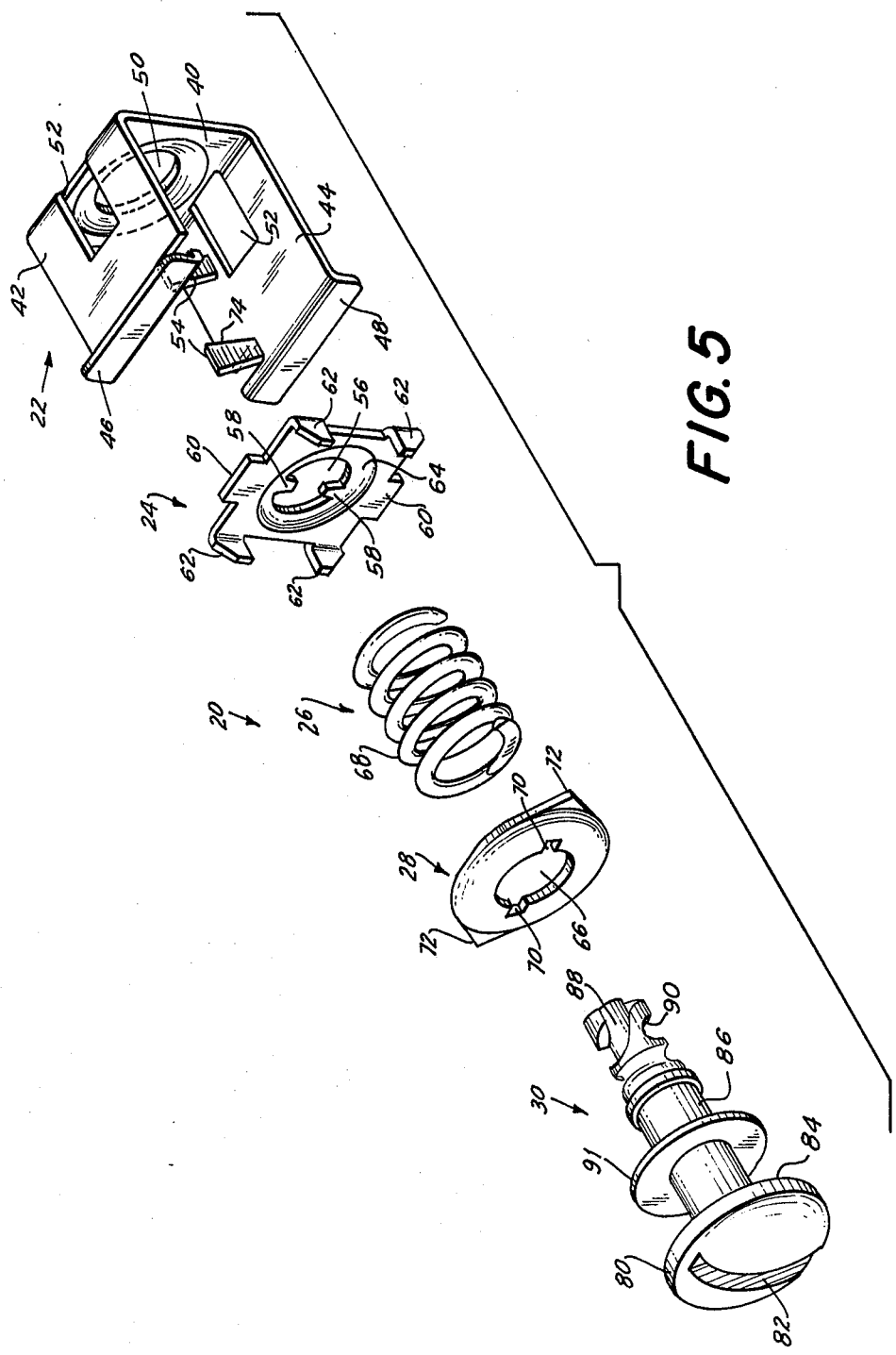
FIG. 5 is an exploded perspective view of the receptacle of the invention and a stud to be employed therewith.

The fastener assembly in assembled condition is depicted in FIGS. 1, 2 and 4 to hold two panels 32 and 34 together. As depicted, panel 32 has an aperture 36 therethrough and panel 34 has an aperture 38 therethrough. These apertures are designed to be placed into alignment so that when the stud 30 is coupled with panel 32 and the receptacle 20 is coupled with panel 34, the stud and receptacle can be interconnected to hold the panels 32 and 34 together.

The U-shaped housing 22 of receptacle 20 includes a base 40 and a pair of upstanding opposing legs 42 and 44. Leg 42 terminates at its free end in an outwardly extending flange 46 and similarly leg 44 terminates at its free upper end with an outwardly extending flange 48.

Base 40 has a central aperture 50 therein and each leg has a rectangularly shaped slot 52 extending upwardly from the base toward the open end but terminating short of the open end of the housing. On each leg adjacent and below the flange 48 at the end of the leg is an inwardly extending tang 54. Each leg 42 and 44 has a tang 54 extending inwardly therefrom and these tangs are located on opposite sides of the housing. It has been found convenient to form tangs 54 by cutting and bending portions of the legs 42 and 44 so that the tangs are integrally formed with the housing.

The base plate 24 is substantially rectangular in configuration with a central aperture 56 therein. A pair of tabs 58 extend inwardly into the aperture and are diametrically opposed. Aligned with the tabs 58 and extending outwardly from the plate 24 are a pair of opposed projections 60 which are designed to fit and slide vertically in slots 52 of the housing. Four upstanding corner stops 62 are located at the four corners of the plate 24 and extend upwardly from the surface thereof. The plate 24 is adapted to be inserted into the housing with aperture 56 aligned with aperture 50 of the housing and projections 60 slidably mounted in slots 52. Thus, the plate 24 is permitted limited vertical reciprocation while being prevented from rotational movement by the positioning of the projection 60 in the slots 52.

Helical spring 26 is a conventional type of helical compression spring and is large enough to seat on base plate 24, particularly in the beveled portion 64 surrounding aperture 56 and cover stops 62 assist in retaining the spring. The upper end of helical spring 26 seats against the undersurface of cam follower plate 28. It has been found effective to make cam follower plate 28 substantially circular in configuration and small enough in diameter to permit its rotation within housing 22. The cam follower plate 28 is formed with a central aperture 66 for alignment with the apertures 56 and 50 of the base plate and housing respectively and also with the passageway 68 through the helical spring 26. A pair of keyway notches 70 are diametrically opposed about aperture 66. Aligned with the keyways 70 are a pair of opposing triangularly shaped cam follower protrusions 72.

The dimensions of the housing 22, the plate 24, the spring 26, and the cam follower plate 28 are such that when the cam follower, the spring, and the plate are positioned in the housing and the spring 26 partially compressed, the cam follower plate is shiftable or rotatable to a position where protrusions 72 are retained or captured against the undersurface of the opposing tangs 54. To facilitate retention in this position the undersurface 74 of each tang 54 is tapered or sloped downwardly and inwardly thereby guarding against unintentional displacement of the protrusions 72 from beneath tangs 74.

In this condition, the receptacle 20 is prepared for mounting in panel 34. The receptacle is mounted through opening 38 from side 76 of the panel 34 which is the front side. There is no need for access to the rear side 78 of the panel. The receptacle is inserted through opening 38 until the undersurface of flanges 46 and 48 engages surface 76 of the panel 34. The receptacle is designed so that the flanges 46 and 48 will extend a greater distance than the diameter of the opening 38.

When the receptacle 20 is fully positioned in the opening 38 it is in the position as shown in the drawings. An appropriate tool can then be engaged with the keyway notches 70 of cam follower plate 28 and the plate rotated to displace protrusions 72 from engagement with the undersurface of tangs 54. This rotation will bring the protrusions 72 into a position where they are free of legs 42 and 44 and extend outwardly therefrom. Partially compressed spring 26 will then direct the cam follower plate 28 upward until the protrusions 72 engage with the undersurface 78 of panel 34 thereby locking the receptacle in position. The position of the tabs in the locked position is clearly depicted in FIG. 2. In this arrangement, the panel is held between the undersurface of the lateral flanges 46 and 48 and the upper surface of the protrusions 72. The receptacle is then ready to receive a stud to form a fastener assembly.

The number of legs on the housing, and accordingly, the number of tangs and protrusions is a matter of choice.

Figure 3:
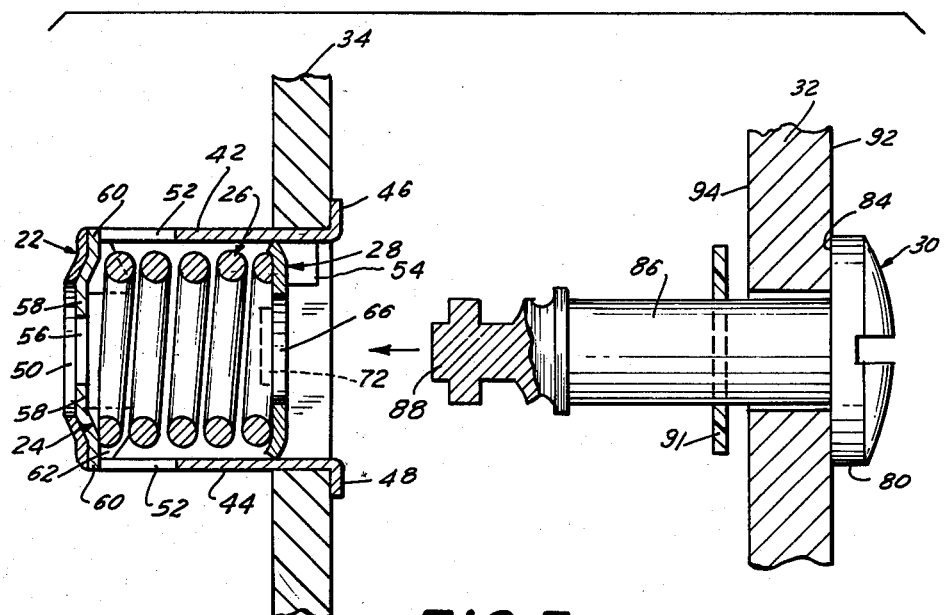
FIG. 3 is a sectional view thereof showing the stud and receptacle in separated position.

As depicted, the stud is conventional and includes an enlarged head 80 with a slot 82 in its upper surface for engagement by a tool for rotational purposes. Extending from the undersurface 84 of the head 80 is a reduced diameter shank 86. Adjacent the end of the shank 86 distal from the head is a spiral cam slot 88. It has been found effective to make the length of the cam slot sufficient to require a quarter turn between the open and closed position. The cam slot generally terminates in a locking detent 90 at the upper end of its spiral path. As a matter of choice, a washer 91 can be employed to facilitate retention of the stud on panel 32 prior to assembling the fastener and fastening of the panels together. As shown in FIG. 3, the stud is mounted to panel 32 by extending the shank 86 through aperture 36. The head 80 is larger than the aperture so that the undersurface 84 of the head engages with the upper surface 92 of the panel. The washer 91 can then be inserted on the shank end and shifted upward into the proximity of the undersurface 94 of panel 32.

The stud is inserted into receptacle 20 as panel 32 is brought into alignment with panel 34. The stud shank passes through aperture 66 in plate 28, through central opening 68 of the compressed helical spring 26, and into the aperture 56 in the base plate 24. At that time, the tabs 58 will engage with the entrance to spiral cam slot 88 and rotation of the stud by use of an appropriate tool in slot 82 will cause the base plate 24 to ride axially upward as tabs 58 follow the spiral cam slot 88 into the locking detents. In the depicted embodiment, a quarter turn rotation is sufficient to accomplish this result. Axial movement of the plate 24 is permitted by the axial freedom of movement of projection 60 in vertical slots 52. Also, the slots 52 prevent rotation of the plate as the stud rotates so that the fastening action can be accomplished. As plate 24 moves upward it compresses spring 26 which is captured between the plate and the undersurface of cam follower plate 28. The cam follower plate is prevented from axial upward movement by the engagement between its protrusions 72 and the undersurface 78 of panel 34. Thus, spring tension is provided by the biased helical spring 26 to assist in retaining the stud and receptacle in fastened condition with the tabs 58 in the locking detents at the inner end of the spiral cam slot 88.

Unfastening is accomplished in easy and efficient manner by rotating stud 30 in the opposite direction thereby permitting plate 64 to travel downward and free tabs 58 from cam slot 88. The stud and panel 32 can then be disassembled from the receptacle and panel 34.

If desired, the receptacle 20 can be disassembled from panel 34 by using the appropriate tool to engage keyway notches 70 and depress cam follower plate 28 downward thereby compressing helical spring 26 until rotation of the cam follower plate 28 will once again bring protrusions 72 into alignment with the undersurface 74 of tangs 54. The receptacle will then be free for removal through aperture 38 of panel 34.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A front insert receptacle for fastening two members together comprising:

a housing formed with a base and at least a pair of opposing legs extending from the peripheral portion of the base in the same direction and being separated from one another about the periphery of the base to provide spacing there between and being adapted to receive a stud therebetween;

a stop surface on the housing to engage with the upper surface of one member when the receptacle is partially extended through an opening therein;

rotational stop means on the housing to prevent rotation of the housing with respect to the one member when extended therein a cam surface on the housing and a shiftable cam follower on the housing initially positioned so that the cam surface retains the cam follower when the housing is inserted in the opening of one member;

biasing means on the housing in engagement with the cam follower and initially biasing the cam follower against the cam surface and responsive to shifting of the cam follower with respect to the cam surface to a position out of engagement therewith whereupon the biasing member will direct at least a portion of the cam follower into engagement with the undersurface of the one member to retain the receptacle in position on the one member;

stud locking means on the housing adapted to engage with the stud after the housing has been mounted on the other member and inserted into the housing whereupon relative rotation of the stud with respect to the housing in one direction will activate the stud locking means and relative rotation of the stud with respect to the housing in a second direction will deactivate the stud locking means and permit the stud to be removed from the housing and the two members to be separated;

the housing being U-shaped in configuration with a pair of opposing spaced legs extending from the base;

the cam surface being at least one inwardly projecting tang extending inwardly from the inner surface of a leg, the undersurface of the tang forming the cam surface for engagement of the cam follower;

the cam follower being a rotatable plate having at least one protrusion extending from the peripheral surface thereof positioned so that the protrusion is located within the housing when the cam follower is in the initial position and when rotated with respect to the cam surface the protrusion will be extended outwardly from the legs of the housing for engagement with the undersurface of the one member.

2. The invention in accordance with claim 1 wherein the undersurface of each tang is sloped downwardly as it extends inwardly from the inner surface of the leg to facilitate retention of the cam follower in the initial position.

3. The invention in accordance with claim 1 wherein a tang extends inwardly from each of the opposing legs of the U-shaped housing and is located adjacent to the open end of the U-shaped housing, the cam follower having a pair of opposing outwardly extending tabs normally in the initial position in engagement with the undersurface of each tang respectively, the cam follower having surfaces thereon for engagement by a tool to facilitate rotation of the cam follower whereupon each tab will be shifted out of engagement with the tang and biased into engagement with the undersurface of the one member to lock the receptacle in position.

4. The invention in accordance with claim 1 wherein the biasing means is in the form of a helical spring captured between the undersurface of the cam follower and the base of the housing and being partially compressed when the cam follower is in the initial position thereby facilitating retention of the receptacle in the initial position during insertion into the one member and the directing of the cam follower into locking engagement with the undersurface of the one member after the cam follower has been rotated out of engagement with the cam surface.

5. The invention in accordance with claim 1 wherein the cam follower has a central aperture therein for alignment with corresponding apertures in the housing and adapted to receive the shank of a stud therethrough, and the shank of the stud having a spiral cam surface thereon and the stud locking means on the housing including cam slot follower means thereon to facilitate locking and unlocking of the stud with respect to the receptacle when the spiral cam slot and the cam slot follower means are interengaged.

6. The invention in accordance with claim 1 wherein each leg of the U-shaped housing has its free end terminating in an outwardly extending flange, the flanges engaging with the upper surface of the one member to assist in retaining the receptacle in position with respect to the one member.

7. The invention in accordance with claim 1 wherein the U-shaped housing is integrally formed as a single piece with each inwardly extending tang being a displaced integral portion of a leg of the housing.

8. The invention in accordance with claim 1 wherein the U-shaped housing has an aperture in its base to receive the shank of a stud therethrough, each of the opposing legs of the U-shaped housing having a slot therein, the slots cooperating with a lock plate to form the locking means on the housing for engagement with the stud, the lock plate being formed with a pair of projections on opposing sides thereof for positioning in a respective slot in the legs of the housing to prevent rotation of the lock plate with respect to the housing, the lock plate having a central aperture therein with inwardly extended tabs thereon adapted for engagement with a cam slot in the shank of the stud so that a quarter turn rotation of the stud with respect to the tabs will shift the stud between the unlocked and locked positions.

* * * * *